Oct. 1, 1929.  A. B. PENDLETON ET AL  1,730,042
ELECTRIC HEATER
Filed Aug. 2, 1928  6 Sheets-Sheet 1
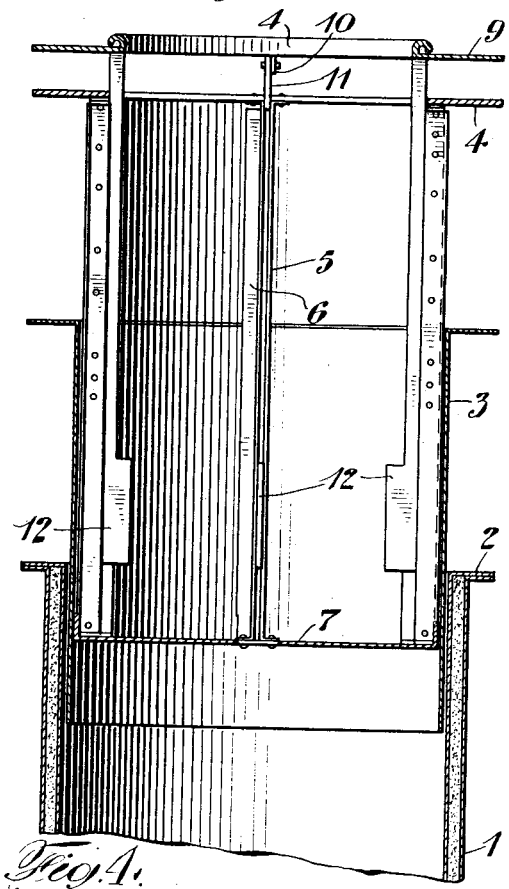
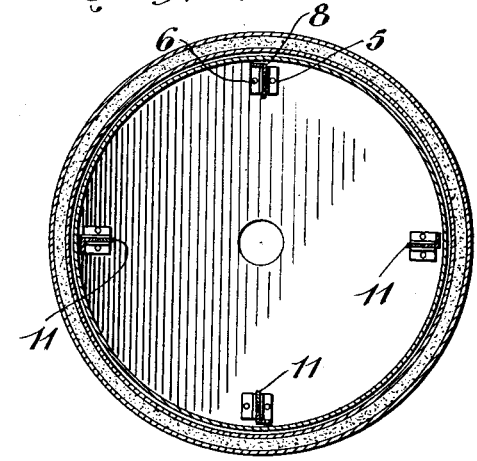
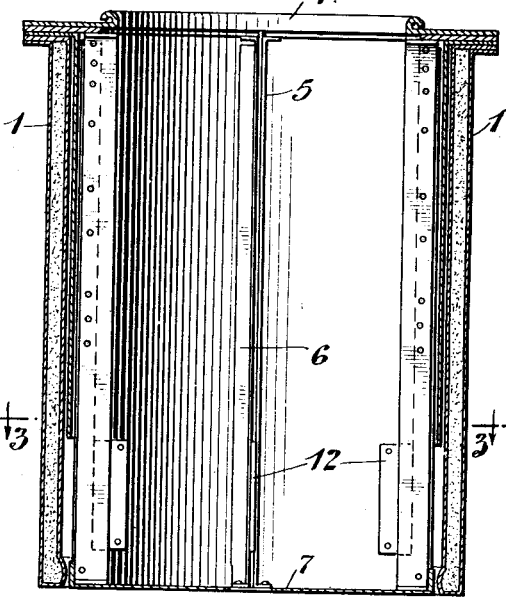
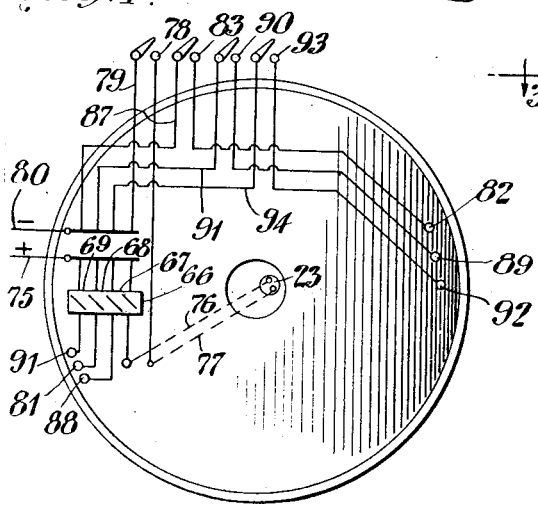
INVENTORS
ARTHUR B. PENDLETON
FREDERIC D. BLAUVELT
BY
their ATTORNEYS.

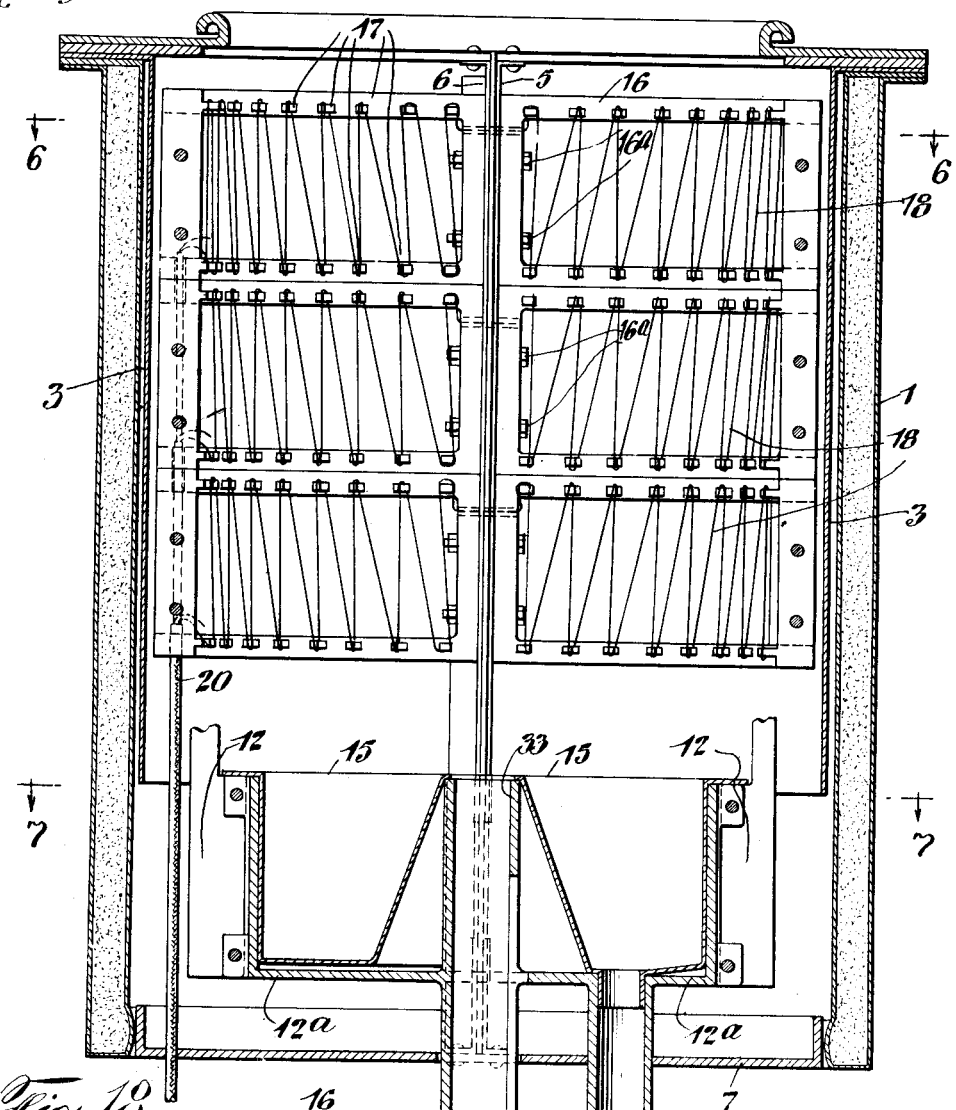
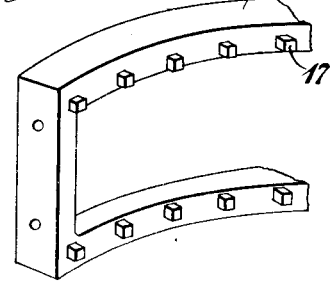

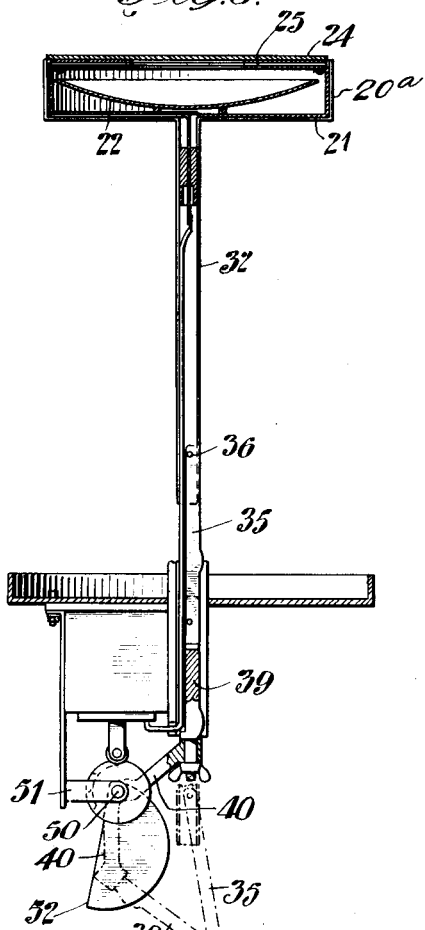
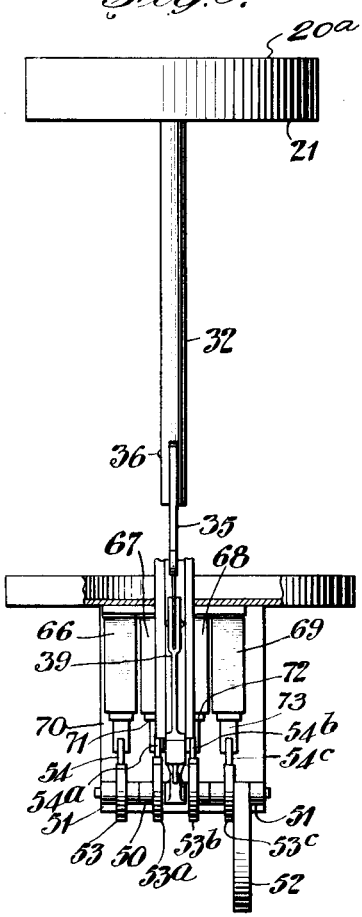
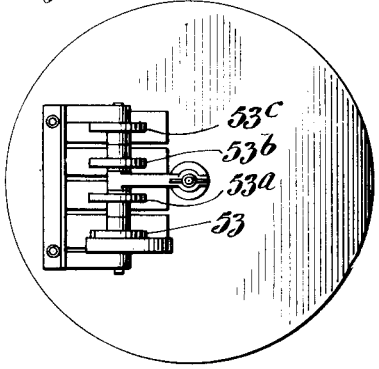
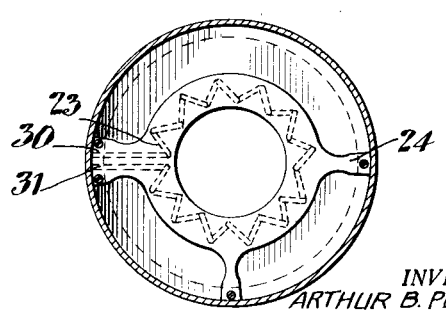
INVENTORS
ARTHUR B. PENDLETON
FREDERIC D. BLAUVELT
BY
their ATTORNEYS.

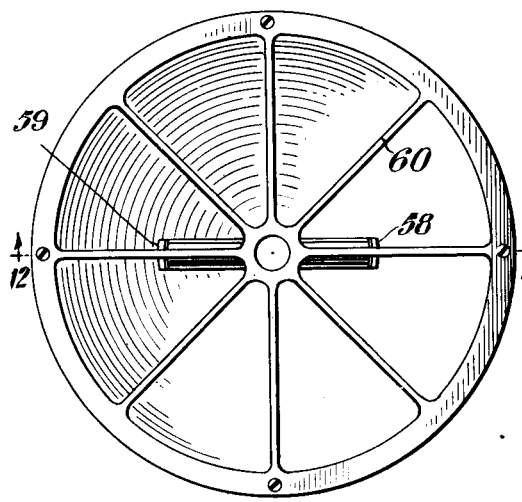
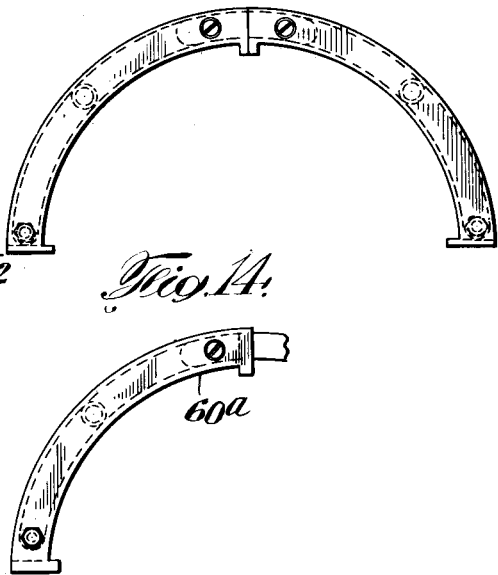
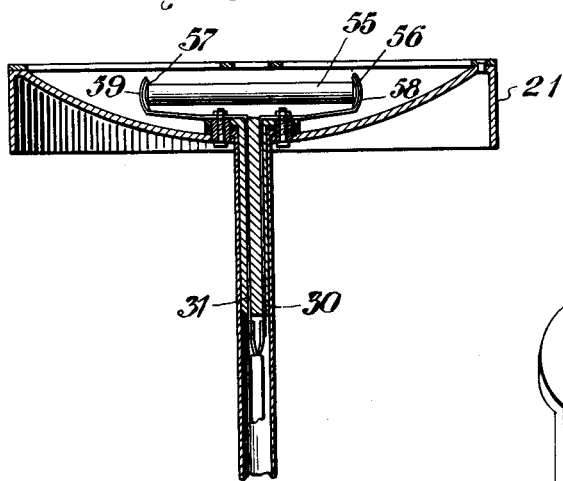
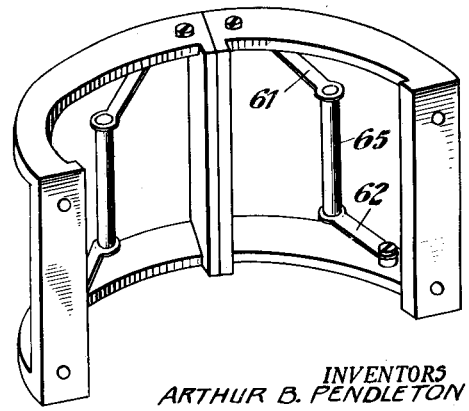

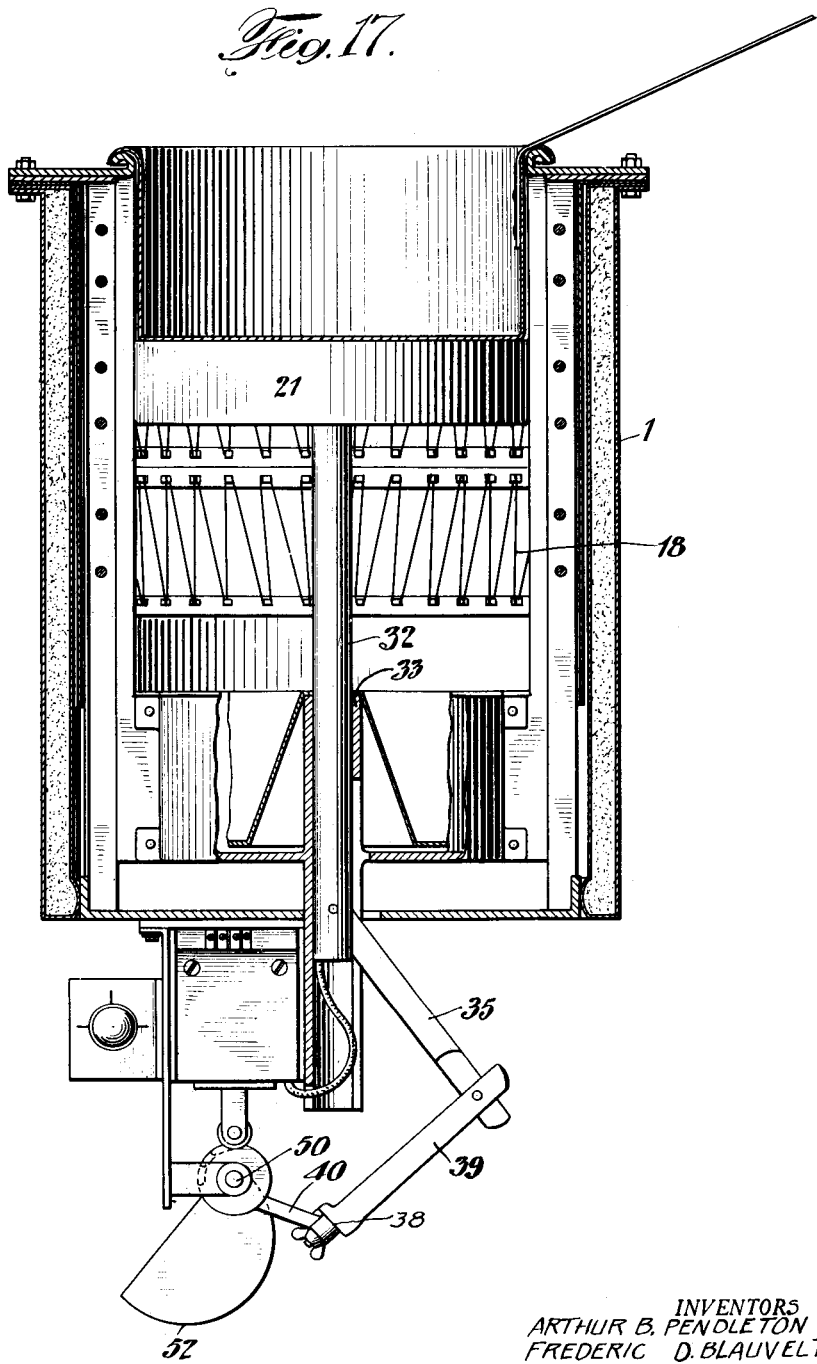

Patented Oct. 1, 1929

1,730,042

UNITED STATES PATENT OFFICE

ARTHUR B. PENDLETON, OF GREENWICH, CONNECTICUT, AND FREDERIC D. BLAUVELT, OF MONTCLAIR, NEW JERSEY

ELECTRIC HEATER

Application filed August 2, 1928. Serial No. 296,895.

This invention relates to a form of electric heater particularly adapted to culinary use; more specifically it comprehends a form of heater which is automatically placed in operation by the positioning of the receptacle to be heated which comprises a number of independent heating elements and in which the heating elements placed in operation have a fixed, predetermined relationship to the dimensions of the vessel to be heated. The invention will be understood from the following description read in conjunction with the drawings, in which:

Fig. 1 is an exploded view in vertical section of part of a heating unit constituting a preferred embodiment of my invention;

Fig. 2 is an assembled view of the parts shown in Fig. 1;

Fig. 3 is a cross section through Fig. 2 on the plane denoted by the line 3—3;

Fig. 4 is a diagram of the electric wiring employed in conjunction with the apparatus shown in the remaining figures;

Fig. 5 is a vertical section through Fig. 1 showing in addition heating elements in position together with the grease collecting pan employed in combination with my heating device;

Fig. 8 is a vertical section through a follower, adapted to move up and down within the heating device previously described, which follower carries a heating element adapted to heat the bottom of a cooking utensil and by its vertical motion determine and controls the relationship between the depth of the utensil to be heated and the heating elements to be placed in operation;

Fig. 9 is a side elevation of Fig. 8 at a right angle to the view shown in Fig. 8;

Figure 10 is a bottom view of the pan mechanism disclosed in Figures 8 and 9.

Figure 11 is a top view of the form of follower designated in Figure 8 by the numeral 20ª.

Fig. 12 is a vertical section through the follower 20ª Fig. 8 showing an alternative form of heating element;

Fig. 13 is a top view of Fig. 12;

Fig. 14 is a top view of an alternative form of heating element adapted to be employed in the construction shown in Fig. 5 in place of the resistance wire heating elements shown in said Fig. 5;

Fig. 15 is a side elevation of two of said alternative heating elements;

Fig. 16 is a top view of Fig. 14 showing the relative position which these elements take when assembled; and Fig. 17 is a vertical section through our device showing a cooking utensil, of a form which we prefer to utilize in connection therewith, in operative position and showing also the changes consequent upon the positioning of the said utensil.

Fig. 18 is a fragmental view of one of the porcelain resistor supporting frames.

Figure 7:
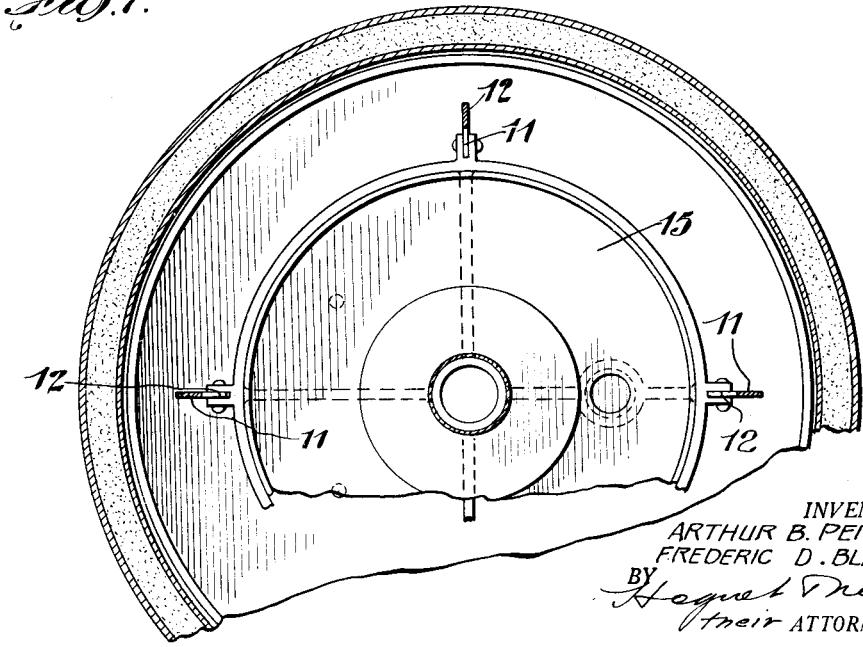
Fig. 7 is a cross section of Fig. 5 on the plane denoted by the line 7—7.

Referring specifically to Fig. 1, the element 1 is formed of two concentric cylinders closed at the bottom and terminating in the flange 2 at the upper part. This element is merely a receptacle for the retention of insulating material, such as magnesia, asbestos, kieselguhr, or any corresponding insulating material or mixture thereof. The elements 1 constitutes the outer shell of our heating apparatus. 3 is a tubular reflector composed preferably of copper, nickel, etc., or of copper plated with chromium to present an internally polished, reflecting surface. The elements 1 and 3 need not be more fully shown for the reason that every cross section through each of them is an annulus, the radii of which are obvious from Fig. 1. The disk 4 carries, suspended therefrom at each quarter, vertical guide pieces corresponding to 5 and 6 which at the bottom are secured to the pan 7. As an additional stiffening means angle irons 8 are positioned between the vertical strips 5 and 6. These angle irons do not completely fill the space between the strips 5 and 6, thereby forming a series of vertical channels. The cover plate 9 carries projecting portions 10 to which there are riveted or similarly secured vertical strips 11. These strips fit the recesses just mentioned so that the cover piece 9, with the attached strips. may be at any time lifted out of the recesses. The vertical strips 11 carry projecting lugs 12 at the lower portion thereof, which, in turn, are riveted to the frame 12ª which holds the grease collecting receptacle 15 shown in Fig. 5. A top view of this grease collecting receptacle appears in Fig. 7.

Figure 6:
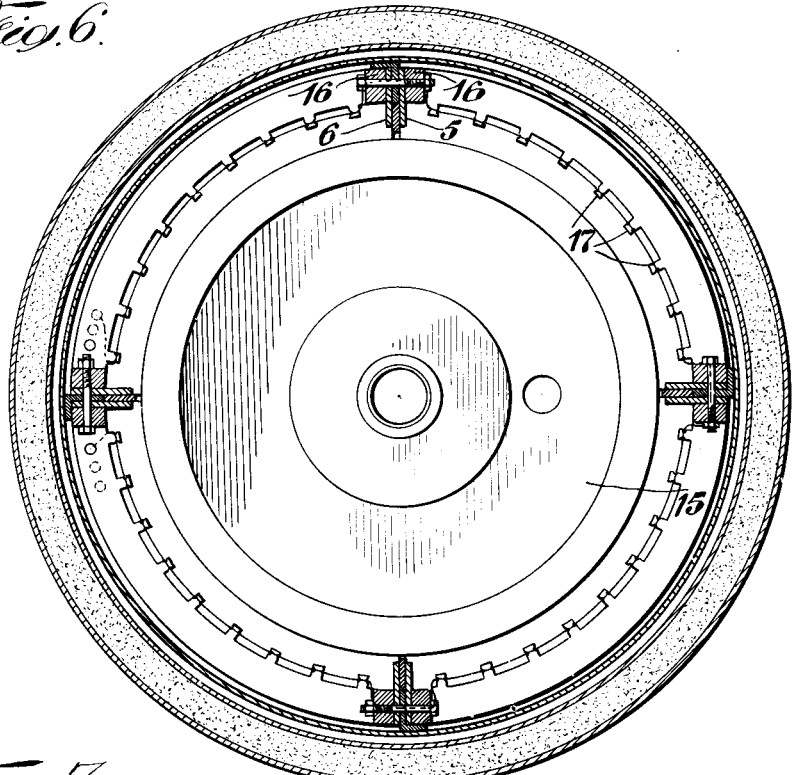
Fig. 6 is a cross section of Fig. 5 on the plane denoted by the line 6—6.

By reference to Fig. 5 it will be seen that a number of frames 16 of insulating material, such as porcelain, are secured to the vertical strips 5 and 6 by means of bolts 16ª. These porcelain members carry a number of projections 17 to which the resistance wire 18 is secured to form a heater element. There are in all twelve of these individual porcelain members, each horizontal group comprising four of them arranged about the circumference of a circle secured to the vertical strips 5 and 6, as hereinbefore noted, and there being three such groups in vertical series. Each horizontal group operates as a unit. The resistance wires of a horizontal group may be arranged in series, parallel or series parallel, so that the group will operate from the available circuit voltage. Fig. 6 is a cross section through such a group. The two leads which transfer current to any particular group are carried down through holes in the porcelain members as, for example, by cable 20 shown at the left in Fig. 5. It will be apparent from this that each of the three groups can be thrown into circuit either singly or in any desired combination by means of appropriate contact mechanism.

We preferably employ in combination with the foregoing a vertically movable heater adapted at all times to lie in contact with the bottom of a cooking vessel placed in our heating device. This may hereinafter be referred to as a follower and is indicated by numeral 20ª in Fig. 8 in which it appears in vertical section. It consists of the pan 21, the curved reflector 22, of any polished reflecting material, and the heating element 23 of resistance ribbon, such as, for instance, nichrome, which may be observed in Fig. 11. This ribbon is carried between two steel plates 24 and 25 and is electrically insulated therefrom by means of mica mats, not shown. The leads 30 and 31, Fig. 11, are carried down along the edge of the pan 21 and thence internally through the tube 32 which forms a support for the heating element and associated parts. The tube 32 reciprocates vertically in a centrally located cylindrical recess 33, Figs. 5 and 17, which is integral with the frame 12ª which holds the grease collecting pan 15. A strip of tape iron 35 is pivotally connected at its lower end to the lever 38, formed of the two members 39 and 40. It will be apparent from the foregoing that the follower is adapted to considerable vertical movement in which the tube 32 is guided by the recess 33 and in which the tape iron 36 functions very much as the connecting rod of an engine, while the crank 38 operates as a crank shaft to convert the reciprocating movement into a vertical sweep through a corresponding angle. The positions of these members at the end of the stroke have been indicated by the outlines 41 in Fig. 8. The cylindrical recess 33 is vertically slotted to permit of the necessary movement of the tape iron 36 while restricting and guiding the tubular member 32. The crank 38 is connected to the shaft 50, Figures 8 and 17, carried by the lug 51. The shaft moves with the crank, being rigidly attached thereto and, in turn, carries at one extremity the counterbalance weight 52, which is so proportioned as to normally hold the follower 20ª so that the upper surface is substantially flush with the upper edge of the disk 4. The follower 20ª will, of course, move downward whenever a vessel is placed in the heating device, as may be seen by reference to Fig. 17, the extent of this downward movement being controlled entirely by the depth of the vessel placed in position. The cams 53, 53ª, 53ᵇ, and 53ᶜ are also carried by the shaft 50 and move through an angle in proportion to the downward movement of the follower 20ª. The rollers 54, 54ª, 54ᵇ and 54ᶜ ride vertically on the surface of the cams 53, 53ª, 53ᵇ and 53ᶜ so that they undergo an upward movement having a fixed proportionality to the downward movement of the follower. The effect of this will be subsequently taken up.

Fig. 12 shows a vertical section through an alternative form of follower 20ª, in which the heating elements consists not of a resistance ribbon but of an elongated rod like member of high resistance 55, carried by the two contact pieces 56 and 57, which are, in turn, held by the spring clips 58 and 59. These clips are suitably insulated from the framework but are electrically connected with two leads 30 and 31 in the same manner as the resistance element previously described. A top view of the follower 20ª, with this alternative form of resistance element in place, appears in Fig. 13, and it will be noted that the spider 60 covers the top of the pan 21 and protects the resistance from accidental contacts. These rod like resistances are preferably composed principally of silicon carbide, and have a resistance such that they will become luminous when connected either singly or in suitable multiples to the ordinary lighting voltages.

Fig. 14 shows a top view of a frame 60ª of metal corresponding to a porcelain frame 16 hereinbefore discussed. Fig. 15 is a perspective view and Fig. 16 a top view of two of these frames as arranged for insertion in the heater shown in Fig. 3. These frames are adapted to carry elongated resistance units in place of resistance wire and are similarly employed. The frames are preferably composed of metal and carry spring clips such as 61 and 62 which hold resistance elements 65 in position. The spring clips are suitably insulated from the metal of the frame by mica mats or corresponding insulating means, not shown. These particular resistors may be connected in series, parallel or series parallel and are preferably so assembled that a horizontal group of frames with the contained resistances may be connected to the voltages of the available lighting circuits. Their use is analogous to that of the porcelain frames and resistance wires carried thereby previously considered.

As hereinbefore stated the downward movement of the follower 20$^a$ moves the cams 53, 53$^a$, 53$^b$ and 53$^c$ through a fixed angle, thereby communicating the corresponding vertical movement to the rollers 54, 54$^a$, 54$^b$ and 54$^c$. These cams are staggered so that the downward movement of the rollers commences at different points in relation to the downward movement of the follower so that the respective switches 66, 67, 68 and 69 are caused to form successive contacts as the follower is progressively displaced from resting position. The switches 66 to 69 inclusive may be of any conventional type in which contact is effected by the protrusion of the push rods 70, 71, 72 and 73. and for that reason will not be more fully described. The switch 66 which forms the first contact upon the displacement of the follower is connected in series with the resistance within the follower 20$^a$ so that any depression of the follower from rest position will operate to close the circuit and thereby places the resistance element in the follower in operation. The switch 67 is connected in series with the upper bank of circumferentially disposed heating elements, and the cam 53$^a$ is so designed that this switch forms a contact whenever the follower has been downwardly displaced below the upper bank of heating elements. The switch 68 is connected in series with the middle bank of heating elements, and the roller 54$^b$ and the cam 53$^b$ cooperating therewith are so formed that this switch makes contact and places the middle bank of heating elements in operation whenever the follower has been displaced from rest position to a point below the middle bank of heating elements; correspondingly, the switch 69 is connected in series to the last bank of heating elements, and the roller 54$^c$ and cam 53$^c$ cooperating therewith are so formed that this switch makes contact whenever the follower has been displaced below the lower bank of heating elements. The various switch connections are additive so that when the follower has been displaced below the lower bank of heating elements and follower resistance and all three banks of circumferentially disposed resistances are simultaneously in circuit and heat is applied to the bottom and sides of any vessel positioned within the heater.

It will be apparent that we are not limited to the use of the three horizontal groups of circumferentially disposed heating elements shown or to the precise form of heating apparatus illustrated but may employ any form in which the fundamental principle is carried into effect and any number of horizontal groups of heating elements.

The details of the wiring in the electric circuit herein described will be apparent from Fig. 4 in which the switch is diagrammatically indicated by the numerals 66 to 69, inclusive. One leg of the power circuit is indicated by the numeral 75 and this is connected in series with the respective switches. The switch 66 discharges into the lead 76 which is connected into the resistance element 23 in the follower circuit. The return from 23 is carried through the lead 77 to the variable resistance 78. The resistance 78 is manually operable so that a permanent adjustment may be made thereby which will adapt the apparatus to variations in the power circuit or a temporary adjustment may be made to diminish or otherwise control the amount of heat supplied at any time. The resistance element 78 is preferably provided with some form of indicating device to facilitate adjustment such as, for example, a variable adjustment showing the legends high, medium and low when the switch is in the corresponding position. The lead 79 returns to the other leg 80 of the power circuit. The switch 67 is connected to the lead 88 which, in turn, is connected to the top bank of circumferentially disposed heating elements in our heating device. The return from this bank of heating elements is through the lead 82 which is connected in series with the switch and resistance element 83, substantially identical with the element 78 previously described. The lead 87 connects the switch and resistance element 83 into the leg 80 of a power circuit. The switch 68 discharges into the lead 81 which is connected to the middle bank of circumferentially disposed heating elements. The return from this is effected by the lead 89 connected in series with the switch and resistance element 90 which is substantially identical with the element 78 previously described. The switch 90 is connected through the lead 91 to a leg 80 of the power circuit. The switch 69 is connected to the lead 91 which, in turn, is connected to the lower bank of circumferentially disposed heating elements. The return from this bank of heating elements is effected by the lead 92 connected to the switch and resistance element 93 which is a duplicate of 78 previously described. The lead 94 connects the switch 93 back to the leg 80 of a power circuit.

It will be apparent from the foregoing description that our heating device may be employed either singly or collectively with others and may be suitably supported and assembled to form a multi-burner heater, such as a domestic cooking stove. Particularly adapted to use as a domestic or heavy duty stove, the device is not by any means limited to this purpose and is susceptible to a great variety of modifications and utilizations, all of which fall within the scope of our broad invention. It will be further apparent that the invention is not limited to the use of electric heating elements but that other heating means, such as, for instance, gas, may be substituted without departing from the invention, and the phrase heating element may be herein employed to denote a heating means of any character. The specific embodiment of our invention has been given by way of illustration and it is our intention that the invention be limited only by the appended claims, or their equivalents, in which we have endeavored to claim broadly all inherent novelty.

We claim:

1. A heater for vessels containing materials to be heated having a recess adapted to receive vessels of varying dimensions to be heated, a number of independent heating elements in said recess, means for causing the positioning of a vessel to be heated to automatically place in operation a number of said heating elements having a fixed relationship to the dimensions of the vessel to be heated and to automatically take out of operation said heating elements upon the removal of said vessel.

2. An electric heater for vessels containing materials to be heated having a recess adapted to receive vessels of varying dimensions to be heated, a number of independent electric heating elements in said recess, an electric circuit, a number of means for independently connecting said heating elements in said circuit, means for causing the positioning of a vessel to be heated to automatically place in operation a number of said connecting means, thereby connecting a number of said heating elements having a fixed relationship to the dimensions of the vessel to be heated.

3. An electric heater for vessels containing materials to be heated having a recess with walls substantially vertical and adapted to receive vessels of varying depths to be heated, a number of heating elements carried by said walls at different levels, an electric circuit, a number of means for independently connecting said heating elements in said circuit, a means for causing the positioning of a vessel to be heated to automatically place in operation a number of said connecting means, thereby connecting a number of said heating elements having a fixed relationship to the dimensions of said vessel.

4. A heater for vessels containing materials to be heated having a recess with walls substantially vertical and adapted to receive vessels of varying depths to be heated, a number of independent heating elements carried by said walls at different levels, means for causing the positioning of a vessel to be heated to automatically place in operation a number of said heating elements above the lower level of the positioned vessel.

5. An electric heater for vessels containing materials to be heated having a recess with walls substantially vertical and adapted to receive vessels of varying depths to be heated, a number of heating elements carried by said walls at different levels, an electric circuit, a number of means for independently connecting said heating elements in said circuit, a means for causing the positioning of a vessel to be heated to automatically place in operation a number of said connecting means, thereby connecting a number of said heating elements above the lower level of the positioned vessel.

6. An electric heater for vessels containing materials to be heated comprising a well type of heating receptacle adapted to receive vessels to be heated of varying depths, a number of independent heating elements carried at different levels in said receptacle, an electric circuit, a number of means for independently connecting said heating elements in said circuit, means for causing the positioning of a vessel to be heated to automatically place in operation a number of said connecting means, thereby connecting a number of said heating elements having a fixed relationship to the depth of the said vessel.

7. An electric heater for vessels containing materials to be heated comprising a well type of heating receptacle adapted to receive vessels to be heated of varying depths, a number of independent heating elements carried at different levels in said well, an electric circuit, a number of means for independently connecting said heating elements in said circuit, means for causing the positioning of a vessel to be heated to automatically operate a number of said connecting means, thereby connecting a number of said heating elements above the lower level of the positioned vessel.

8. Apparatus according to claim 7 in which the heating elements at different levels are circumferentially disposed.

9. An electric heater having a recess adapted to receive vessels of varying depths containing materials to be heated, means for supporting a vessel so that a substantial portion of the sides thereof is within the said recess, a number of heating elements carried by the walls of said recess at different relative distances from the point of introduction of said vessel, an electric circuit, a number of means for independently connecting said heating elements in said circuit, means for causing the positioning of a vessel to be heated to automatically place in operation a number of said connecting means, thereby connecting a number of said heating elements having a fixed relationship to the depth of the positioned vessel.

10. An electric heater having a recess adapted to receive vessels of varying depths containing materials to be heated, means for supporting a vessel so that a substantial portion of the sides of the said vessel is within the said cavity, a number of heating elements carried by the wall of said recess at different relative distances from the point of introduction of said vessel, an electric circuit, a number of means for independently connecting said heating elements in said circuit, means for causing the positioning of a vessel to be heated to automatically place in operation a number of said connecting means, thereby connecting a number of said heating elements in proximity to the sides of the vessel.

11. An electric heater having a cavity adapted to receive vessels of varying depths suspended therein from the upper edge of said vessel, a number of independent heating elements carried by the walls of said cavity at different levels, an electric circuit, a number of means for independently connecting said heating elements in said circuit, means for causing the positioning of a vessel to be heated suspended from the upper edge of said cavity to place in operation a number of said connecting means, thereby connecting a number of said heating elements having a fixed relationship to the depth of said vessel.

12. An electric heater having a cavity adapted to receive vessels of varying depths suspended therein from the upper edge of said vessel, a number of independent heating elements carried by the walls of said cavity at different levels, an electric circuit, a number of means for independently connecting said heating elements in said circuit, means for causing the positioning of a vessel to be heated suspended from the upper edge of said cavity to automatically place in operation a number of said connecting means, thereby connecting a number of said heating elements in proximity to the sides of the positioned vessel.

13. Apparatus according to claim 11 comprising in addition a washer shaped member at the upper end of said cavity having a raised circumferential edge portion adapted to receive the upper edge of a vessel suspended in said cavity and to deflect materials spilled from said vessel away from contact with said heating elements.

14. Apparatus according to claim 11 comprising in addition a member at the upper part adapted to deflect away from the heater elements material spilled from a vessel suspended in said apparatus.

15. Apparatus for heating materials comprising in combination a vessel having a circumferential overturned flange at the upper edge, a heater, a suspension for said vessel positioned above said heater comprising a washer shaped member having a raised circumferential edge portion adapted to fit the said overturned flange to form a seal and to deflect material spilled from said vessel away from said heater.

16. Apparatus for heating materials having a recess adapted to enclose a substantial part of the sides of vessels of varying depths, comprising in combination a vessel having a circumferential overturned flange at the upper edge, a suspension for said vessel comprising a washer shaped member having a raised circumferential edge portion adapted to fit said overturned flange to form a seal and to deflect materials spilled from said vessel, a number of independent heating elements carried by the walls of said recess at different distances from the point of introduction of said vessel, an electric circuit, a number of independent means for connecting said heating elements in said circuit, means for causing the positioning of a vessel to be heated to automatically operate a number of said connecting means, thereby connecting a number of said heating elements having a fixed relationship to the depth of the said vessel.

17. An electric heater having a recess adapted to receive vessels of varying depths containing materials to be heated, a follower adapted to maintain contact with the bottom of a vessel introduced in said recess, a heating element carried by said follower.

18. An electric heater having a recess adapted to receive vessels of varying depths containing materials to be heated, a follower adapted to maintain contact with the bottom of a vessel introduced in said recess, a heating element carried by said follower, an electric circuit, means for causing the positioning of a vessel to be heated and consequent movement of said follower to operate said connecting means.

19. An electric heater having a cavity adapted to receive vessels of varying depths containing materials to be heated, comprising a number of independent heating elements carried by the walls of said cavity at different distances from the point of introduction of said vessel, an electric circuit, a number of switching means for independently connecting said heating elements in said circuit, a follower adapted to maintain contact with the bottom of a vessel introduced in said cavity, means for causing the positioning of a vessel to be heated and consequent movement of said follower to automatically operate a number of said switching means, thereby connecting a number of said heating elements having a predetermined relationship to the depth of the introduced vessel.

20. An electric heater having a cavity adapted to receive vessels of varying depths suspended therein containing materials to be heated, comprising a number of heating elements carried by the walls of said cavity at different levels, an electric circuit, a number of means for independently connecting said heating elements in said circuit, a follower adapted to maintain contact with the bottom of a vessel introduced in said cavity, means for causing the positioning of a vessel to be heated and consequent movement of said follower to operate a number of said connecting means, thereby connecting the said heating elements above the lower level of the introduced vessel.

21. An electric heater having a cavity adapted to receive vessels of varying depths containing materials to be heated, an electric circuit, a number of heating elements carried by the walls of said cavity at different distances from the point of introduction of said vessel, a number of means for independently connecting said heating elements in said circuit, a follower adapted to maintain contact with the bottom of a vessel introduced in said cavity, a heating element carried by the said follower, means for connecting the carried heating element in an electric circuit, means for causing the positioning of a vessel to be heated and consequent movement of said follower to operate a means for connecting the heater carried by said follower and to operate a number of means for connecting the heating elements carried by the walls of said cavity, thereby connecting a number of said heating elements having a fixed relationship to the depth of the introduced vessel.

22. An electric heater having a recess adapted to receive vessels suspended therein containing materials to be heated, heating elements carried by the walls of said recess, a grease collecting pan adjacent the bottom of said recess.

23. An electric heater having a recess adapted to receive vessels of varying depths suspended therein containing materials to be heated, heating elements carried by the walls of said recess, a grease collecting pan adjacent the bottom of said recess, an outlet from said grease collecting pan, a grease receptacle detachably secured to the said outlet.

24. A heater having a recess adapted to receive vessels of various dimensions to be heated, heating elements, means actuated by vessel to be heated controlling said heating elements, the number of said heating elements in operation having a fixed relationship to the depth of the vessel to be heated.

25. An electric heater having a recess adapted to receive vessels of various dimensions to be heated, electric heating elements, means actuated by vessel to be heated controlling said electric heating elements, the number of said electric heating elements in operation having a fixed relationship to the depth of the vessel to be heated.

In testimony whereof, we have signed our names to this specification this 25th day of July, 1928.

ARTHUR B. PENDLETON.
FREDERIC D. BLAUVELT.